United States Patent [19]

Reischl

[11] 4,305,858

[45] Dec. 15, 1981

[54] PROCESS FOR THE PREPARATION OF STABLE IONIC DISPERSIONS OF POLYISOCYANATE-POLYADDITION PRODUCTS IN HYDROXYL CONTAINING COMPOUNDS

[75] Inventor: Artür Reischl, Leverkusen, Fed. Rep. of Germany

[73] Assignee: Bayer Aktiengesellschaft, Leverkusen, Fed. Rep. of Germany

[21] Appl. No.: 175,989

[22] Filed: Aug. 7, 1980

Related U.S. Application Data

[63] Continuation of Ser. No. 16,632, Mar. 1, 1979, abandoned, which is a continuation of Ser. No. 740,454, Nov. 10, 1976, abandoned.

[30] Foreign Application Priority Data

Nov. 12, 1975 [DE] Fed. Rep. of Germany ....... 2550797

[51] Int. Cl.$^3$ ...................... C08L 75/04; C08G 18/38
[52] U.S. Cl. .................... 260/29.2 TN; 260/33.4 UR; 521/163; 528/48; 528/51; 528/65; 528/71; 528/73
[58] Field of Search ................ 260/29.2 TN, 33.4 UR

[56] References Cited

U.S. PATENT DOCUMENTS

| | | | |
|---|---|---|---|
| 3,325,421 | 6/1967 | Muller | 260/29.2 TN |
| 3,360,495 | 12/1967 | Muller et al. | 260/33.2 |
| 3,714,095 | 1/1973 | Reischl et al. | 260/29.2 TN |
| 3,931,112 | 1/1976 | Wagner et al. | 260/33.4 UR |
| 3,948,837 | 4/1976 | Schmitt et al. | 260/29.2 TN |

FOREIGN PATENT DOCUMENTS

| | | |
|---|---|---|
| 469538 | 8/1973 | Australia. |
| 837174 | 3/1970 | Canada. |
| 2229404 | 2/1973 | Fed. Rep. of Germany. |

OTHER PUBLICATIONS

English Translation—German Pat. No. 920,512, 11.54, Schlack.
U.S. Pat. No. 3,306,875, cols. 1–2, 35–36, Hay.

*Primary Examiner*—Harold D. Anderson
*Attorney, Agent, or Firm*—Gene Harsh; Joseph C. Gil

[57] ABSTRACT

This invention relates to a process for the preparation of finely divided, stable and relatively low viscosity dispersions of ionic polyisocyanate polyaddition products in compounds having hydroxyl groups by reacting
(1) organic polyisocyanate with
(2) compounds having primary and/or secondary amino groups and/or primary hydroxyl groups in
(3) compounds having at least one hydroxyl group, with the proviso that compounds (3) have secondary hydroxyl groups if compounds with primary hydroxyl groups are used as compound (2), and further characterized in that at least one of the components (1) or (2) has groups which are ionic and/or capable of salt formation.

10 Claims, No Drawings

PROCESS FOR THE PREPARATION OF STABLE IONIC DISPERSIONS OF POLYISOCYANATE-POLYADDITION PRODUCTS IN HYDROXYL CONTAINING COMPOUNDS

This is a continuation of application Ser. No. 16,632, filed Mar. 1, 1979, now abandoned, which itself is a continuation of application Ser. No. 740,454, filed Nov. 10, 1976, now abandoned.

BACKGROUND OF THE INVENTION

Non-ionic diisocyanate polyaddition products dispersed in polyethers of polyesters are already known. According to the teaching of German Auslegeschrift No. 1,168,075, diisocyanates are reacted with bifunctional primary alcohols in a dispersing medium consisting of a polyether or polyester (molecular weight 500 to 3000) containing at least two (exclusively secondary) hydroxyl groups in the molecule. According to German Auslegeschrift No. 1,260,142, compounds containing isocyanate and amino groups undergo a polyaddition reaction in situ in a polypropylene glycol ether dispersing agent. Non-ionic dispersions of polyurethanes, polyureas or polyhydrazodicarbonamides in polyvalent, higher molecular weight hydroxyl compounds obtained by the above mentioned processes are recommended as thickeners for the textile or dye industry because of their high viscosities even at low solids contents.

Thus a 10% (or 20%) dispersion of polyhydrazodicarbonamide in a polypropylene glycol ether obtained according to German Auslegeschrift No. 1,260,142 for example, has a viscosity of over 10,000 (or 200,000, in the case of a 20% dispersion) cP at 25° C. This amounts to more than 10 (or 200, in the case of a 20% dispersion) times the viscosity of the pure dispersing agent. When attempts are made to prepare a 40% dispersion, the reaction mixture solidifies before polyaddition has been completed. The high viscosities which occur at even relatively low solids contents seriously restrict the possibilities of using the products because, in many fields of application, they cannot be dosed with the aid of the usual dosing apparatus. For producing polyurethane foams, for example, a purpose for which such dispersions could be used, the viscosities of the starting materials must be below 2500 cP when conventional high pressure machines are employed.

DESCRIPTION OF THE INVENTION

It has now been found that stable ionic dispersions having the desired low viscosity can be obtained by reacting polyisocyanates with compounds having salt groups or groups capable of salt formation "in situ", in dispersing agents consisting of compounds containing hydroxyl groups. In addition to ionic compounds, other non-ionic chain-lengthening agents may also be used. The reaction may be carried out continuously in continuous flow mixers, preferably in the presence of more than one percent by weight of water, based on the total quantity of reaction mixture. Alternatively, and this is preferred because of the simpler dosing and mixing technique and in many cases the easier removal of heat of reaction, the reaction is carried out in simple stirrer apparatus (batchwise reaction in vessels) in the presence of a larger quantity of water, preferably more than 5% by weight, based on the total quantity of reaction mixture.

The ability to use large amounts of water is particularly surprising for the following reasons:

A water content of 10, 15 or 20% by weight (based on the total quantity of polyether and water), for example, increases the viscosity of a polyalkylene ether glycol at 25° C. to 4, 8 and 50 times the original value, respectively (3500, 7300 and over 50,000 cP). If the water content is further increased, the solutions or emulsion originally obtained in many cases separate into two phases. Both the high increase in viscosity and phase separation inevitably led experts to assume that the addition of water would be unsuitable for the commercial production of low viscosity polyisocyanate polyaddition products in compounds containing hydroxyl groups, particularly since the water might, in addition, interfere chemically with the isocyanate polyaddition reaction.

The present invention thus relates to a process for the in situ preparation of stable dispersions of polyisocyanate polyaddition products in hydroxyl containing compounds as dispersing agents by the reaction of (1) organic polyisocyanates with (2) compounds having primary and/or secondary amino groups and/or primary hydroxyl groups in (3) compounds having at least one hydroxyl group.

Compounds (3) contain secondary hydroxyl groups in cases where compounds (2) contain primary hydroxyl groups. The process is further characterized in that at least one of the components (1) or (2) contains ionic groups or groups capable of salt formation. The components are advantageously reacted in the presence of more than about 1% by weight, preferably from 5 to 50% and most preferably 10 to 25% by weight of water, based on the total quantity of reaction mixture, the water being subsequently removed in known manner, if desired.

According to the invention, the compounds used as component (2) are preferably polyamines and/or hydrazines and/or hydrazides.

In another embodiment of the invention, reactants (1) may consist in part of (1) monoisocyanates and/or reactants (2) may consist in part of primary or secondary monoamines and/or monohydrazides for the purpose of adjusting the product to a particular molecular weight. Alkanolamines may also be used in the polyaddition reaction for the same purpose. In this way, ionic polyurea or polyhydrazodicarbonamide particles containing reactive groups are obtained.

Although emulsifying and dispersion stabilizing substances such as polyethers which contain amino, semicarbazide or hydrazide groups in addition to one or two hydroxyl groups may be added if desired, the addition of such compounds is generally not necessary since emulsifying groups are already built into the ionic polyaddition compounds.

The present invention also relates to stable ionic dispersions of polyurethane, polyureas or polyhydrazodicarbonamides in dispersing agents consisting of compounds having at least one hydroxyl group.

The ionic dispersions according to the invention may be used as starting components for the production of polyurethane resins, in particular foams.

The dispersing agents (component 3) of the present invention are the continuous, external phase. They are alcohols containing 2 to 8, preferably 2 to 6, most preferably 2 to 4 primary and/or secondary hydroxyl groups and having a molecular weight of from about 62 to about 16,000, preferably 62 to 12,000 and most preferably 106 to 8000. These include, for example, both low molecular weight alcohols or glycols having molecular weights of between 62 and about 400 which may also contain either, thioether or ester bonds and polyesters, polyethers, polythioethers, polyacetals, polycarbonates and polyester amides having molecular weights of more than 400, such as those known per se for the production of polyurethanes.

Suitable low molecular weight dispersing agents include monohydric alcohols such as butanol, 2-ethylhexanol, amyl alcohol and ethylene glycol monoethyl ethers and diols or triols of the kind conventionally used as chain lengthening agents or cross-linking agents in polyurethane chemistry, e.g., propylene glycol-(1,2) and -(1,3); butylene glycol-(1,4) and -(2,3); hexanediol-(1,6); octanediol-(1,8); neopentyl glycol; cyclohexane dimethanol (1,4-bis-hydroxymethylcyclohexane); 2-methyl-1,3-propanediol; glycerol; trimethylolpropane; hexanetriol-(1,2,6); butanetriol-(1,2,4) and trimethylolethane. Particularly useful are glycols having a hydrophilic character, e.g. ethylene glycol, diethylene glycol, triethylene glycol or tetraethylene glycol, and polyethylene glycols having a molecular weight of up to 400. In addition, however, compounds such as dipropylene glycol, polypropylene glycols having molecular weights of up to 400, dibutylene glycol, polybutylene glycols having molecular weight of up to 400, thiodiglycol and castor oil may also be used as dispersing agents according to the invention.

Also useful as dispersing agents are ester diols of the general formula

HO—(CH$_2$)$_x$—CO—O—(CH$_2$)$_y$—OH and

HO—(CH$_2$)$_x$—O—CO—R—CO—O—(CH$_2$)$_x$—OH in which

R represents an alkylene or arylene group having from 1 to 10, preferably 2 to 6 carbon atoms;

x=2 to 6 and
y=3 to 5.

Examples of such compounds are δ-hydroxybutyl-ε-hydroxy-caproic acid ester; ω-hydroxy-hexyl-γ-hydroxybutyric acid ester; adipic acid-bis-(β-hydroxyethyl) ester; terephthalic acid-bis(β-hydroxyethyl)-ester; and diol urethanes of the general formula HO—(CH$_2$)$_x$—O—CO—NH—R'—NH—CO—O—(CH$_2$)$_x$—OH in which R' represents an alkylene, cycloalkylene or arylene group having from 2 to 15, preferably 2 to 6, carbon atoms and x represents an integer of from 2 to 6, e.g. 1,6-hexamethylene-bis-(β-hydroxyethylurethane) or 4,4'-diphenylmethane-bis-(δ-hydroxybutylurethane).

Also suitable are diolureas of the general formula

HO—(CH$_2$)$_x$—N—CO—NH—R''—NH—CO—N—(CH$_2$)$_x$—OH
          |                                           |
          R'''                                      R''' in which

R'' represents an alkylene, cycloalkylene or arylene group having from 2 to 15, preferably 2 to 9 carbon atoms, R''' = H or CH$_3$ and x=2 or 3, e.g. 4,4'-diphenylmethane-bis-(β-hydroxyethylurea) or the compound

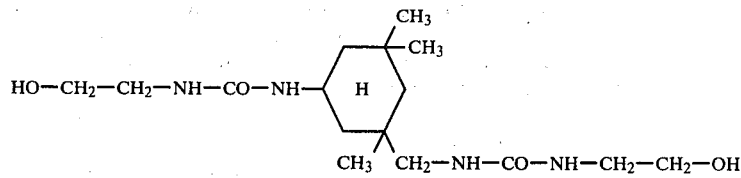

Particularly suitable among the dihydric and trihydric low molecular weight alcohols are those which, either alone or as mixtures or with the addition of higher molecular weight alcohols, are liquid at temperatures below 50° C.

Higher molecular weight hydroxyl polyesters which are suitable as dispersing agents include, for example, reaction products of polyhydric, preferably dihydric alcohols to which trihydric alcohols may be added, and polybasic, preferably dibasic carboxylic acids. Instead of free polycarboxylic acids, the corresponding polycarboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or may be unsaturated. The following are mentioned as examples: Succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally mixed with monomeric fatty acids, dimethylterephthalate and bis-glycol terephthalate. Suitable polyhydric alcohols include e.g. ethylene glycol; propylene glycol-(1,2) and -(1,3); butylene glycol-(1,4) and -(2,3); hexanediol-(1,6); octanediol-(1,8); neopentyl glycol; cyclohexane dimethanol (1,4-bis-hydroxymethyl-cyclohexane); 2-methyl-1,3-propanediol; glycerol; trimethylolpropane; hexanetriol-(1,2,6); butanetriol-(1,2,4); trimethylolethane; triethyleneglycol; tetraethyleneglycol; polyethylene glycols; dipropylene glycol; polypropylene glycols; dibutylene glycol and polybutylene glycols. The polyesters may also contain a proportion of carboxyl end groups. Polyesters of lactones, e.g. ε-caprolactam, or hydroxycarboxylic acid. e.g. ω-hydroxycaproic acid may also be used.

The higher molecular weight polyethers preferably used as dispersing agents according to the invention are obtained in known manner by reaction of starting compounds which contain reactive hydrogen atoms with alkylene oxides such as ethylene oxide, propylene oxide, butylene oxide, styrene oxide, tetrahydrofuran or epichlorohydrin or with any mixtures of these alkylene oxides. In many cases it is preferred to use polyethers which contain predominantly primary hydroxyl groups. Suitable starting compounds containing reactive hydrogen atom include e.g. water, methanol, ethanol, ethylene glycol, propylene glycol-(1,2) or -(1,3), butylene glycol-(1,4) or -(2,3), hexanediol-(1,6), octane diol-(1,8), neopentyl glycol, 1,4-bis-hydroxymethylcyclohexane, 2-methyl-1,3-propanediol, glycerol, trimethylolpropane, hexane triol-(1,2,6), butanetriol-(1,2,4), trimethylolethane, pentaerythritol, mannitol, sorbitol, methylglycoside, sucrose, phenol isononylphenol, resorcinol, hydroquinone, 1,2,2- or 1,1,3-tris-(hydroxyphenyl)-ethane, ammonia, methylamine, ethylenediamine, tetra- or hexamethylenediamine, diethylenetriamine, ethanolamine, diethanolamine, triethanolamine, aniline, phenylenediamine, 2,4- and 2,6-diaminotoluene and polyphenylpolymethylene-polyamines of the kind obtained by aniline-formaldehyde condensation. Resinous materials such as phenol and resol resins may also be used as starting materials. Polyethers modified by vinyl polymers are also suitable for the process according to the invention. Products of this kind may be obtained by polymerizing e.g. styrene and acrylonitrile in the presence of polyethers (U.S. Pat. Nos. 3,383,351, 3,304,273, 3,523,095, 3,110,695, German Pat. No. 1,152,536).

Among the polythioethers which should be particularly mentioned are the condensation products obtained from thiodiglycol on its own and/or with other glycols, dicarboxylic acids, formaldehyde, aminocarboxylic acids or amino alcohols. The products obtained are either polythio mixed ethers, polythioether esters or polythioether ester amides, depending on the components.

Suitable polyacetals include e.g. the compounds which can be prepared from glycols such as diethylene glycol, triethylene glycol, 4,4'-dioxethoxy-diphenyldimethylmethane, hexanediol and formaldehyde. Polyacetals suitable for the purpose of the invention may also be prepared by the polymerization of cyclic acetals.

Suitable polycarbonates containing hydroxyl groups include these known per se such as the products obtained from the reaction of diols such as propanediol-(1,3), butane-diol (1,4) and/or hexanediol-(1,6), diethylene glycol, triethylene glycol or tetraethylene glycol with diaryl-carbonates, e.g. diphenylcarbonate or phosgene.

Suitable polyester amides and polyamides include, for example, the predominantly linear condensates obtained from polyvalent saturated and unsaturated carboxylic acids or their anhydrides and polyvalent saturated and unsaturated amino alcohols, diamines, polyamines or mixtures thereof.

Mixtures of the above mentioned high and low molecular weight dispersing agents may of course also be used according to the invention, as already mentioned above.

The dispersing agents which are preferred according to the invention are those which are free from amy labile groups, e.g. ester groups, which are liable to be destroyed by hydrolysis or aminolysis in the process of the present invention. Unstable compounds of this kind are preferably added to the finished dispersion only after completion of the polyaddition reaction.

The hydroxyl compounds and mixtures thereof used as dispersing agents according to the invention should be chosen so that when mixed with the water to be added according to the invention and with any hydroxyl compounds or, preferably, amino compounds and optionally inert solvents, they are liquid at the reaction temperature, i.e. in the form of solutions or emulsions. Their viscosity at the reaction temperature should generally be below 20,000 cP and preferably below 5000 cP so that conventional stirrer and mixing apparatus can be employed.

If inert solvents are to be used, they should preferably distill off as azeotropic mixtures with water. Examples include benzene and toluene.

The following compounds or mixtures thereof may be used in the process according to the invention as components and contain (a) (i) at least one hydrogen atom reactive with isocyanate groups or (a) (ii) at least one isocyanate group and (b) at least one ionic group or group capable of salt formation:

(I) Compounds containing basic amino groups capable of being neutralized with aqueous acids or tertiary amino groups capable of being quaternized:

(a) Alcohols, in particular alkoxylated aliphatic, cycloaliphatic aromatic and heterocyclic secondary amines, e.g. N,N-dimethylethanolamine; N,N-diethylethanolamine; N,N-dibutylethanolamine; 1-dimethylamino-propanol-(2); N,N-methyl-β-hydroxyethylaniline; N,N-methyl-β-hydroxypropylaniline; N,N-ethyl-β-hydroxyethylaniline; N,N-butyl-β-hydroxyethylaniline; N-oxethyl-piperidine; N-oxethylmorpholine; α-hydroxyethylpyridine and γ-hydroxyethylquinoline.

(b) diols and triols, in particular alkoxylated aliphatic, cycloaliphatic, aromatic and heterocyclic primary amines, e.g. N-methyl-diethanolamine; N-butyl-diethanolamine; N-oleyl-diethanolamine; N-cyclohexyl-diethanolamine; N-methyl-diisopropanolamine; N-cyclohexyl-diisopropanolamine; N,N-dioxethylaniline; N,N-dioxyethyl-m-toluidine; N,N-dioxethyl-p-toluidine; N,N-dioxypropyl-napthylamine; N,N-tetraoxyethyl-α-aminopyridine; dioxyethylpiperazine; polyethoxylated butyl diethanolamine; polypropoxylated methyl diethanolamine (molecular weight about 1000); polypropoxylated methyldiethanolamine (molecular weight about 2000); polyesters having tertiary amino groups; tri-[2-hydroxypropyl-(1)]-amine; N,N-di-n-(2,3-dihydroxypropyl)-aniline; N,N'-dimethyl-N,N'-bis-oxethylhydrazine and N,N'-dimethyl-N,N'-bis-oxypropyl-ethylenediamine.

(c) Amino alcohols, e.g. products of addition of alkylene oxide and acrylonitrile to primary amines, which addition products are obtained by hydrogenation. These include, for example N-methyl-N-(3-aminopropyl)-ethanolamine; N-cyclohexyl-N-(3-aminopropyl)-propanol-(2)-amine; N,N-bis-(3-aminopropyl-ethanolamine and N-3-aminopropyl-diethanolamine.

(d) Amines, e.g. N,N-dimethylhydrazine; N,N-dimethylethylenediamine; 1-di-ethylamino-4-amino-pentane; α-aminopyridine; 3-amino-N-ethylcarbazole; N,N-dimethyl-propylene-diamine; N-aminopropyl-piperidine; N-amino-propyl-morpholine; N-amino-propyl-ethyleneimine and 1,3-bis-piperidino-2-aminopropane.

(e) Diamines, triamines, amides in particular those obtained by hydrogenation of products of the addition of acrylonitrile to primary or disecondary amines, e.g. bis-(3-aminopropyl)-methylamine; bis-(3-aminopropyl)-cyclohexylamine; bis-(3-aminopropyl)-aniline; bis-(3-aminopropyl)-toluidine; diaminocarbazole; bis-(aminopropoxyethyl)-butylamine; tris-(aminopropyl)-amine; or N,N'-bis-carbonamidopropyl-hexamethylenediamine; and the compounds obtained by the addition of acrylamide to diamine or diols.

(II) Compounds containing halogen atoms which are capable of quaternizing reactions or the corresponding esters of strong acids:

2-Chloroethanol; 2-bromoethanol; 4-chlorobutanol; 3-bromopropanol; β-chloroethylamine; 6-chlorohexylamine; ethanolamine-sulphuric acid ester; N,N-bis-hydroxyethyl-N'-m-chloromethylphenylurea; N-hydroxyethyl-N'-chlorohexylurea; glycerol aminochloroethyl-urethane; chloroacetyl-ethylenediamine; bromoacetyl-dipropylene-triamine; trichloroacetyl-triethylenetetramine; glycerol-α-bromohydrin; polypropoxylated glycerol-α-chlorohydrin; polyesters containing aliphatically bound halogen or 1,3-dichloropropanol-2.

The following are mentioned as corresponding isocyanates: Chlorohexylisocyanate; m-chlorophenylisocyanate; p-chlorophenylisocyanate; bis-chloromethyl-diphenylmethane-diisocyanate; 2,4-diisocyanato-benzyl chloride; 2,6-diisocyanatobenzyl chloride; N-(4-methyl-3-isocyanatophenyl)-β-bromoethyl-urethane.

(III) Compounds containing carboxylic acid or hydroxyl groups capable of salt formation:

(a) Hydroxy and mercapto carboxylic acids: Glycollic acid, thioglycollic acid, lactic acid, trichlorolactic acid, malic acid, dihydroxymaleic acid, dihydroxyfumaric acid, tartaric acid, dihydroxytartaric acid, mucic acid, saccharic acid, citric acid, glyceroboric acid, pentaerythrito-boric acid, mannitoboric acid, salicylic acid, 2,6-dihydroxybenzoic acid, protocatechuic acid, α-resorcyclic acid, β-resorcyclic acid, hydroquinone-2,5-dicarboxylic acid, 4-hydroxyisophthalic acid, 4,6-dihydroxy-isophthalic acid, hydroxyterephthalic acid, 5,6,7,8-tetrahydronaphthol-(2)-carboxylic acid-(3), 1-hydroxynaphthoic acid-(2), 2,8-dihydroxynaphthoic acid-(3), β-hydroxypropionic acid, m-hydroxybenzoic acid, pyrazolone carboxylic acid, uric acid, barbituric acid, resols and other formaldehyde-phenol condensation products.

(b) Polycarboxylic acids:

Sulphodiacetic acid, nitrilotriacetic acid, ethylenediaminotetraacetic acid, diglycollic acid, thiodiglycollic acid, methylene-bis-thioglycollic acid, malonic acid, oxalic acid, succinic acid, glutaric acid, adipic acid, maleic acid, fumaric acid, gallic acid, phthalic acid, tetrachlorophthalic acid, isophthalic acid, terephthalic acid, naphthalene tetracarboxylic acid-(1,4,5,8), o-tolyl-imido-diacetic acid, β-naphthylimido-diacetic acid, pyridine dicarboxylic acid, dithiodipropionic acid.

(c) Aminocarboxylic acids:

Oxaluric acid; anilinoacetic acid; 2-hydroxy-carbazolecarboxylic acid-(3); glycine; sarcosine; methionine; α-alanine; β-alanine; 6-aminocaproic acid; 6-benzoylamino-2-chlorocaprioc acid; 4-amino-butyric acid; aspartic acid; glutamic acid; histidine; anthranilic acid; 2-ethylaminobenzoic acid; N-(2-carboxyphenyl)-aminoacetic acid; 2-(3'-amino-benzenesulphonylamino)-benzoic acid; 3-aminobenzoic acid; 4-aminobenzoic acid; N-phenylamino-acetic acid; 3,4-diaminobenzoic acid; 5-aminobenzenedicarboxylic acid; 5-(4'-aminobenzoylamino)-2-aminobenzoic acid.

(d) Hydroxy and carboxy sulphonic acids:

2-Hydroxyethane sulphonic acid; phenolsulphonic acid-(2); phenolsulphonic acid-(3); phenolsulphonic acid-(4); phenoldisulphonic acid (2,4); sulphoacetic acid; m-sulphobenzoic acid; p-sulphobenzoic acid; benzoic acid-(1)-disulphonic acid-(3,5); 2-chloro-benzoic acid-(1)-sulphonic acid-(4); 2-hydroxy-benzoic acid-(1)-sulphonic acid-(5); naphthol-(1)-sulphonic acid; naphthol-(1)-disulphonic acid; 8-chloronaphthol-(1)-disulphonic acid; naphthol-(1)-trisulphonic acid; naphthol-(2)-sulphonic acid-(1); naphthol-(2)-trissulphonic acid; 1,7-dihydroxy-naphthalenesulphonic acid-(3); 1,8-dihydroxy-naphthalene-disulphonic acid-(2,4); chromotropic acid; 2-hydroxynaphthotic acid-(3)-sulphonic acid-(6); 2-hydroxy-carbazole-sulphonic acid-(7).

(c) Aminosulphonic acids:

Amidosulphonic acid; hydroxylamine monosulphonic acid; hydrazine disulphonic acid; sulphanilic acid; N-phenylamino-methanesulphonic acid; 4,6-dichloroanilinesulphonic acid-(2); phenylene diamine-(1,3)-disulphonic acid-(4,6); N-acetyl-naphthylamine(1)-sulphonic acid-(3); naphthylamine-(1)-sulphonic acid; naphthylamine-(2)-sulphonic acid; naphthylaminedisulphonic acid; naphthylamine-trisulphonic acid; 4,4'-di-(p-aminobenzoylamino)-diphenylurea-disulphonic acid-(3,3'); phenylhydrazine-disulphonic acid-(2,5); 2,3-dimethyl-4-aminoazo-benzene-disulphonic acid-(4'-5); 4'-aminostilbene-disulphonic acid-(2,2')-4-azo-4-anisole; carbazoledisulphonic acid-(2,7); taurine; methyltaurine; butyltaurine; 3-amino-benzoic acid-(1)-sulphonic acid-(5); 3-amino-toluene-N-methane-sulphonic acid; 6-nitro-1,3-dimethylbenzene-4-sulphamic acid; 4,6-diaminobenzenedisulphonic acid-(1,3); 2,4-diaminotoluene-sulphonic acid-(5); 4,4'-diaminodiphenyl-disulphonic acid-(2,2'); 2-aminophenol-sulphonic acid-(4); 4,4'-diamino-diphenylethersulphonic acid(2); 2-aminoanisole-N-methanesulphonic acid; 2-amino-diphenylamine-sulphonic acid.

Salt forming agents for Group I may be inorganic or organic acids, compounds containing reactive halogen atoms, or the corresponding esters of strong acids. The following are some examples of such compounds:

Hydrochloric acid, nitric acid, hypophosphorous acid, amidosulphonic acid, hydroxylamine monosulphonic acid, formic acid, acetic acid, glycollic acid, lactic acid, chloroacetic acid, ethyl bromoacetate, sorbitoboric acid, methyl chloride, butyl bromide, dimethylsulphate, diethylsulphate, benzyl chloride, p-toluenesulphonic acid methyl ester, methyl bromide, ethylene chlorohydrin, ethylene bromohydrin, glycero-α-bromohydrin, ethyl chloroacetate, chloroacetamide, bromoacetamide, dibromoethane, chlorobromobutane, dibromobutane, ethylene oxide, propylene oxide and 2,3-epoxypropanol.

The compounds of Group II may be quaternized or quaternized with tertiary amines or also with sulphides or phosphines to produce quaternary ammonium and phosphonium salts and ternary sulphonium salts.

Examples include trimethylamine, triethylamine, tributylamine, pyridine, triethanolamine, the compounds mentioned under Groups Ia and Ib, dimethylsulphide, diethylsulphide, thiodiglycol, thiodiglycollic acid, trialkylphosphines, alkylarylphosphines and triarylphosphines.

The agents used to form salts with compounds of Group III may be inorganic or organic bases such as sodium hydroxide, potassium hydroxide, potassium carbonate, sodium bicarbonate, ammonia or primary, secondary or tertiary amines. Organic phosphorus compounds may also be used as compounds capable of salt formation. These phosphorus compounds include those basic phosphines which can be built into the molecule, e.g. diethyl-β-hydroxyethyl phosphine, methyl-bis-β-hydroxyethylphosphine or tris-β-hydroxymethylphosphine and derivatives, e.g. phosphinic acids, phosphonous acids, phosphonic acids and esters of phosphorous and phosphoric acid and their thioanalogues, e.g. bis-(α-hydroxy-isopropyl)-phosphinic acid, hydroxyalkane phosphonic acid and phosphoric acid-bis-glycol ester.

According to the invention, it is preferred to use ionogenic components carrying sulphonate, carboxylate and/or ammonium groups.

For preparing anionic polyol dispersions, ionification of the products of the process is most simply carried out by reacting salts, for example sulphonates or carboxylates containing groups which are reactive with isocyanates, with polyisocyanates in the polyol. The salts may either be added in the form of dilute aqueous solutions or the pure salts may be dissolved in the polyol by the addition of water. Alternatively, the free acid may be mixed with the polyol, and aqueous alkali may then be stirred in until the reaction mixture is neutral.

Cationic dispersions, for example products containing quaternary nitrogen, may be prepared, for example, by first preparing a polyioscyanate polyaddition product containing tertiary nitrogen in the polyol by the methods to be described hereinafter, and then distilling off the water completely, and then methylating, for example with an equivalent or subequivalent quantity of dimethylsulphate. Instead of using organic alkylating agents, cationic groups may also be subsequently formed by means of organic acids or mineral acids, optionally in the presence of water.

In some cases it may be advantageous to use the ionogenic component in the form of a prepolymer. For example, a hydroxyl compound containing ionic groups or groups capable of salt formation may first be reacted with an excess of polyisocyanate and the resulting ionogenic prepolymer may then be used as the isocyanate component to which non-ionogenic isocyanates may be added in the process according to the invention. Conversely, ionogenic isocyanates may, of course, first be reacted with an excess of a polyamine and then used according to the invention.

The total quantity of ionogenic components (i.e. salts or salt forming components) is such that the finished polyurethane or polyurea dispersion has an ionic group content of from 0.001 to about 0.5, preferably from 0.01 to 0.25 equivalents per 100 g of solid matter.

If the salt forming compounds or compounds containing salt groups are at least bifunctional, they may be used as the sole component (1) or (2) in the process according to the invention for preparing the ionic dispersion.

If, on the other hand, the components which contain salt groups or are capable of salt formation are only monofunctional, their monofunctionality should be compensated by the addition of components having a functionality higher than 2 in order to obtain higher molecular weights.

The other components suitable for preparation of the dispersions according to the invention, which are reactive towards isocyanates but which are free from ionic groups, are particularly polyamines, hydrazines and hydrazides.

Suitable polyamines include divalent and/or higher valent primary and/or secondary aliphatic, araliphatic, cycloaliphatic and aromatic amines, e.g. ethylene diamine, 1,2- and 1,3-propylene diamine; tetramethylenediamine; hexamethylenediamine, dodecamethylenediamine; trimethyldiaminohexane; N,N'-dimethylethylenediamine; 2,2'-bis-aminopropylmethylamine; higher homologues of ethylene diamine such as diethylene triamine, triethylene tetramine and tetraethylene pentamine; homologues of propylenediamine such as dipropylenetriamine; piperazine; N,N'-bis-aminoethylpiperazine; triazine; 4-aminobenzylamine; 4-aminophenylethylamine; 1-amino-3,3,5-trimethyl-5-aminomethylcyclohexane; 4,4'-diaminodicyclohexylmethane and propane; 1,4-diaminocyclohexane; phenylenediamines; naphthylenediamines; condensates of aniline and formaldehyde; tolylenediamines; bis-amino-methylbenzenes and derivatives of the above mentioned aromatic amines monoalkylated on one or both nitrogen atoms. The polyamines generally have a molecular weight of from 60 to about 10,000, preferably 60 to 3000 and most preferably 60 to 1000.

Suitable hydrazines include hydrazine itself and monosubstituted or N,N'-disubstituted hydrazines in which the substituents may be $C_1$ to $C_6$ alkyl groups, cyclohexyl groups or phenyl groups. The hydrazines generally have a molecular weight of from 32 to about 500. Hydrazine itself is preferred.

Suitable hydrazides include the hydrazides of dibasic or higher basic carboxylic acids such as carbonic acid; oxalic acid; malonic acid; succinic acid; adipic acid; sebacic acid; azelaic acid; maleic acid; furmaric acid; phthalic acid; isophthalic acid; terephthalic acid; esters of hydrazine monocarboxylic acid with dihydric or higher hydric alcohols and phenols such as ethanediol, propanediol-(1,2), butanediol-(1,2), -(1,3) and -(1,4), hexanediol, diethyleneglycol, triethyleneglycol, tetraethyleneglycol, dipropyleneglycol, tripropyleneglycol and hydroquinone; and amides or hydrazine monocarboxylic acid (semicarbazides), for example with the above mentioned diamines and polyamines. The hydrazides generally have a molecular weight of from 90 to about 10,000, preferably 90 to 3000 and most preferably 90 to 1000.

The amines and hydrazines mentioned above may be used in the form of their dilute aqueous solutions or they may be used as mixtures with the dispersing agent diluted with the required quantity of water.

The starting components (1) used according to the invention also include aliphatic, cycloaliphatic, araliphatic, aromatic and heterocyclic polyisocyanates such as those described, for example, by W. Siefken in Justus Liebigs Annalan der Chemie, 562, pages 75 to 136. These include ethylene diisocyanate; 1,4-tetramethylene diisocyanate; 1,6-hexamethylene diisocyanate; 1,12-dodecane-diisocyanate; cyclobutane-1,3-diisocyanate; cyclohexane-1,3- and -1,4-diisocyanate and any mixtures of these isomers; 1-isocyanato-3,3,5-trimethyl-5-isocyanatomethyl-cyclohexane as described in German Auslegeschrift No. 1,202,785 and U.S. Pat. No. 3,401,190; 2,4- and 2,6-hexahydrotolylene diisocyanate and any mixtures of these isomers; hexahydro-1,3 and-/or -1,4-phenylene diisocyanate; perhydro-2,4'- and/or 4,4'-diphenylmethane diisocyanate; 1,3- and 1,4-phenylenediisocyanate; 2,4- and 2,6-tolylene diisocyanate and any mixtures of these isomers; diphenylmethane-2,4'- and/or 4,4'-diisocyanate; naphthylene-1,5-diisocyanate; triphenylmethane-4,4',4''-triisocyanate; polyphenyl-polymethylene polyisocyanates of the kind which can be obtained by aniline formaldehyde condensation followed by phosgenation and which have been described, for example, in British Pat. Nos. 874,430 and 848,671; m- and p-isocyanatophenyl-sulphonyl-isocyanates according to U.S. Pat. No. 3,454,606; perchlorinated aryl polyisocyanates such as those described e.g. in German Auslegeschrift No. 1,157,601 and U.S. Pat. No. 3,277,138; polyisocyanates containing carbodiimide groups as described in German Pat. No. 1,092,007 and U.S. Pat. No. 3,152,162; diisocyanates of the kind described in U.S. Pat. No. 3,492,330; polyisocyanates having allophanate groups as described e.g. in British Pat. No. 994,890; Belgian Pat. No. 761,626 and published Dutch Patent Application No. 7,102,524; polyisocyanates having isocyanurate groups as described e.g. in U.S. Pat. No. 3,001,973; German Pat. Nos. 1,022,789, 1,222,067 and 1,027,394 and German Offenlegungsschriften Nos. 1,929,034 and 2,004,048; polyisocyanates with urethane groups, e.g. as described in Belgian Pat. No. 752,261 and U.S. Pat. No. 3,394,164; polyisocyanates having acylated urea groups according to German Pat. No. 1,230,778; polyisocyanates with biuret groups as described e.g. in German Pat. No. 1,101,394; U.S. Pat. Nos. 3,124,605 and 3,201,372; and British Pat. No. 889,050; polyisocyanates prepared by telomerization reactions as described in U.S. Pat. No. 3,654,106; polyisocyanates with ester groups, for example those mentioned in British Pat. Nos. 965,474 and 1,072,956; U.S. Pat. No. 3,567,763 and German Pat. No. 1,231,688; reaction products of the above mentioned isocyanates with acetals according to German Pat. No. 1,072,385 and polyisocyanates containing polymeric fatty acid groups according to U.S. Pat. No. 3,455,883.

The distillation residues containing isocyanate groups obtained from the commercial production of isocyanates may also be used, if desired as solutions in one or more of the above mentioned polyisocyanates. Any mixtures of the above mentioned polyisocyanates may also be used.

So-called prepolymers may, of course, also be used as isocyanate components according to the invention i.e. reaction products of low molecular weight and/or higher molecular weight compounds having hydroxyl and/or amino groups, e.g. those of the kind mentioned above, with an excess of the monomeric polyisocyanates described above.

Some or all of the isocyanates or amines, hydrazines or hydrazides used in the present process according to the invention may have a functionality higher than 2. It must be regarded as surprising that the reaction according to the invention of such higher functional compounds in dispersing agents which have hydroxyl groups does not result in solid or, at least, very highly viscous reaction products but rather gives rise to finely divided, low viscosity dispersions.

The polyaddition products produced by the present process as dispersions in compounds containing hydroxyl groups may, as already mentioned above, be modified by the addition of a proportion of ionogenic but monofunctional isocyanates, amines, hydrazine derivatives or ammonia to which non-ionogenic compounds may also be added.

Thus, for example, the average molecular weight of polyaddition products can be adjusted as desired by the incorporation of such monofunctional compounds. Polyureas or polyurea polyhydrazodicarbonamides containing free hydroxyl groups can be obtained by using alkanolamines having primary or secondary amino groups. The introduction of other groups such as ester groups, longer aliphatic groups, tertiary amino groups and active double bonds, can also be achieved by the addition of suitably substituted monoamines, diamines or isocyanates.

Suitable non-ionogenic monofunctional isocyanates include e.g. alkyl isocyanates such as methyl, ethyl, isopropyl, isobutyl, hexyl, lauryl and stearyl isocyanate; cyclohexyl isocyanate; cyclohexyl isocyanate; phenyl isocyanate; tolyl isocyanate; 4-chlorophenylisocyanate and diisopropylphenylisocyanate.

Suitable non-ionogenic monoamines include e.g. alkylamines and dialkylamines containing $C_1$ to $C_{18}$ alkyl groups; cycloaliphatic amines such as cyclohexylamine and its homologues; aniline and N-alkylanilines and aniline derivatives which are substituted in the benzene ring; alkanolamines such as ethanolamine, diethanolamine, propanolamine, dipropanolamine, butanolamine and dibutanolamine and diamines having a tertiary and primary or secondary amino groups, e.g. N,N-dimethylethylenediamine and N-methylpiperazine. Suitable monofunctional hydrazine derivatives and hydrazides include e.g., N,N-dialkylhydrazines, the hydrazides of monocarboxylic acids, hydrazine monocarboxylic acid esters of monofunctional alcohols or phenols, and semicarbazides e.g. methyl, ethyl, propyl, butyl, hexyl, dodecyl, stearyl, phenyl and cyclohexylsemicarbazide.

The molecular weight of the polyaddition products prepared according to the invention as dispersions in hydroxyl compounds is determined by the proportion by weight of polyamine, hydrazine or hydrazide on the one hand to polyisocyanate and monofunctional compounds, if added, on the other. It is particularly preferred to react approximately equivalent quantities of isocyanates and hydroxyl functional or, preferably, amino functional compounds in the hydroxyl containing dispersing agent. Chain lengthening agents which have primary hydroxyl groups are reacted in a dispersing agent containing exclusively secondary hydroxyl groups. A limited excess of isocyanate may also be used but the products then obtained have a relatively high viscosity, increasing with the amount of isocyanate excess used, since the excess of polyisocyanate reacts with the dispersing agent. Low molecular weight chain lengthening agents such as amine, hydrazine or hydrazide, on the other hand, may be used in large excess without causing an increase in the viscosity; polyaddition products having reactive end groups and a limited molecular weight are obtained in such cases. The equivalent ratio of polyisocyanate to chain lengthening agent is generally kept between about 0.50 and about 1.50 and preferably between 0.90 and 1.10. It is particularly preferred to use approximately equivalent quantities.

When polyisocyanates are reacted with polyamines or hydrazines or hydrazides in the presence of compounds having hydroxyl groups, the isocyanate groups react very preferentially with the amino groups but a certain proportion of the hydroxyl groups of the dispersing agent also take part in the reaction, depending on the reaction conditions. This reaction gives rise to polyurea and/or polyhydrazodicarbonamide chains which are chemically linked with the monohydric, or preferably, polyhydric alcohol used as dispersing agent. Such end groups presumably have a dispersing action on the solid particles. The extent to which the hydroxyl groups take part in the polyaddition reaction depends particularly on the reaction temperatures and on the water content. If too large a number of higher molecular weight polyol molecules react with the polyisocyanates, highly viscous dispersions are obtained. This obviously occurs in the process according to German Auslegeschrift No. 1,260,142. On the other hand, if the proportion of polyol molecules taking part in the reaction is too low, that part of the resulting dispersions which is composed of the larger particles is liable to be unstable and undergo sedimentation. The process according to the invention which comprises reaction in a simple stirrer apparatus with reflux condenser when large quantities of water are used or in continuous flow mixers when smaller quantities of water are used, has the surprising effect of making it possible for the proportion of the NCO/OH reaction to be adjusted so that finely divided dispersions having the required low viscosity are obtained, but at the same time, coarser parts of the dispersion are still sufficiently stable so that they will not undergo sedimentation even during prolonged storage at elevated temperatures.

If, however, the ionic content is very low, it is advisable to include emulsifying substances in the polyaddition reaction to increase the stability of the dispersion. These emulsifying substances include e.g. linear polyethers having an average molecular weight of about 300 to about 4000 and carrying isocyanate groups or amino or hydrazide groups at both ends of the chain or, preferably, at only one end.

Thus, for example, minor quantities of isocyanate adducts of diols having the following general formula

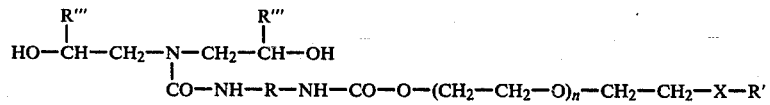

may be used as emulsifying agents. In the above formula, R represents a divalent group such as can be obtained by removal of the isocyanate groups from a diisocyanate having a molecular weight of from about 112 to about 1000; X represents oxygen or —NR''—, R' and R'', which may be the same or different, represent monovalent hydrocarbon groups having from 1 to 12 carbon atoms, R''' represents hydrogen or a monovalent hydrocarbon group having from 1 to 8 carbon atoms and n represents an integer of from 4 to 89.

The preparation of such hydrophilic diols has been described, for example, in German Offenlegungsschrift No. 2,314,512.

Modified polyethers acting as dispersing agents which may be used according to the invention include not only those having the above general formula but also, for example, addition products of excess diisocyanates and/or polyisocyanates of the kind mentioned above as examples with monofunctional and/or bifunctional hydroxyl polyethers having an average molecular weight of from 300 to 4000, which may be freed from unreacted free isocyanate by thin layer evaporation. If desired, these isocyanate prepolymers may also be reacted with excess free isocyanate to form allophanate isocyanates. Addition products containing isocyanate end groups may also be converted into polyethers containing amino or semicarbazide end groups by reaction with excess diamines or hydrazine, e.g. according to German Auslegeschrifts Nos. 1,122,254 or 1,138,200.

Polyethers containing amino end groups, e.g. those prepared by the process according to U.S. Pat. No. 3,155,278 or German Auslegeschrift No. 1,215,373 may also be used as dispersing agents according to the invention.

Lastly, hydroxyl polyethers may be reacted with phosgene to convert them into chloroformic acid esters which may then be reacted with excess diamine or hydrazine. As already mentioned above, polyethers which carry an isocyanate or amino group at only one chain end are preferred as dispersing agents.

The modified polyethers which have a dispersing action are generally only added in quantities of up to about 15% by weight, preferably up to 3% by weight (based on the total quantity of polyol and solid content) to the particularly preferred dispersions according to the invention which have a solids content of about 10 to about 60% by weight. If the dispersions have a higher or lower solids content, a corresponding larger or smaller quantity of dispersing agent is used.

According to a less preferred variation of the process of the invention, compounds of the type mentioned above having two or more primary hydroxyl groups and a molecular weight of from about 62 to about 400 may be reacted with polyisocyanates to which primary alcohols may be added to produce polyurethane dispersions. In that case, however, it should be noted that only dispersing agents which contain exclusively secondary hydroxyl groups may be used and they should preferably have a molecular weight of more than about 500 in order to ensure selective reaction of the polyisocyanate with the primary hydroxyl compounds.

The quantity of water which, according to the preferred embodiment of the invention, may be present during the polyaddition reaction is of decisive importance in determining salt formation, particle size, particle size distribution and the final viscosity of the dispersion. Several factors must be taken into account simultaneously: (1) the viscosity and hydrophilic or hydrophobic character of the dispersing agent containing alcoholic groups; (2) the solubility or emulsifiability of the starting components used for the isocyanate polyaddition reaction; and (3) the ionic content and solids content of the resulting dispersion and the temperatures employed. The sequence and method of addition may also be of some influence. With increasing water content, a significant increase in viscosity occurs, particularly if the dispersing agent used is only slightly hydrophilic and ionic content is low, as already mentioned above by way of example. In all cases, it is necessary to ensure that the reaction mixture can be vigorously mixed in the presence of water during the polyaddition reaction and during the subsequent removal of water by distillation. The quantity of water added would generally be less than 50% by weight but should be at least 2% by weight, based on the total quantity of the reaction mixture. The higher the desired solids content of the dispersion, the more water should be added. The optimum quantity of water is that which results in the lowest possible final viscosity of the dispersion prepared according to the invention but which does not require the removal of unnecessarily large quantities of water by distillation. The preferred quantity of water is, in many cases, between about 5 and about 25% by weight based on the reaction mixture.

When very large quantities of water are used, the ionic group content prevents separation of the phases of the reaction mixture during the polyaddition reaction or solidification during the removal of the water by distillation. It is therefore possible to use a much higher solid content than in the case of non-ionic products. If very hydrophilic alcohols are used, it is also permissible to use small quantities of water, i.e. about 1% by weight.

For obtaining a very low final viscosity, it is advantageous to employ a very high reaction temperature from the start of the polyaddition reaction, preferably a temperature close to the boiling point of water.

When using stirrer vessels with reflux condensers, the heat produced in the strongly exothermic isocyanate reaction can easily be removed by boiling under reflux. At the same time, any adducts formed in the gaseous phase above the liquid reaction mixture can be continuously washed into the liquid phase by the water while still in statu nascendi and finely dispersed therein.

It has been found that in some cases when low molecular weight dispersing agents and where substantially linear polyisocyanate addition compounds are used, solutions rather than dispersions are formed. In this context, "solutions" means a clear, uniform and homogeneous mixture of polyaddition product and dispersing agent. Such solutions are not intended to be covered by the term "dispersion" as used throughout the specification. It has been found, however, that formation of a solution can be easily avoided by the presence of small amounts of water in the dispersing agent. Generally an amount of water of about 1% by weight, based on the total weight of the dispersion is sufficient to avoid the formation of a solution. However, as set forth below, the amount of water in the dispersions may be varied within wide limits depending on the particular system involved and the intended use. In most cases, however, the dispersions may be made completely water-free without being undesirably converted into solutions.

Various methods may be employed for mixing the dispersing agent with the reactants. In the simplest case, the hydroxyl containing dispersing agent, the desired quantity of water and the amino or primary hydroxyl compound are introduced into a stirrer vessel and heated with stirring, for example to 70° to 90° C., and the isocyanate component is added rapidly so that the reaction mixture boils vigorously under reflux. When producing dispersions with a high solids content, it is advantageous to introduce the polysocyanate or polyisocyanate mixture into the lower third of the liquid in the reaction vessel. If suitable stirrer apparatus are employed, the reaction temperature may be raised to 105° to 115° C. by employing a slight excess pressure. When the isocyanate groups have undergone complete reaction, the water and any inert solvent present are distilled off at reduced pressure and the dispersion discharged through a sieve. In many cases, the (aqueous) solution of amino compounds and polyisocyanate may, of course, be introduced simultaneously into the dilution of dispersing agent in water. In that case, however, any excess of isocyanate should be avoided. Part of the heat of reaction may be used up by, for example, mixing the polyisocyanates with part of the alcohol used as dispersing agent at room temperature immediately before it is added to the reaction mixture. If the process according to the invention is desired to be carried out continuously, for example in the case of a large scale commercial production of more than 1000 tons per month, the dispersing agent, reactants and optionally water may be continuously fed into continuous flow mixers. In view of the strongly exothermic nature of the reaction, which increases with increasing solid content, and hence the increasing vapor pressure, the time of stay in the reactor must be so short that the reaction temperature in the premixer as far as possible does not exceed 100° C. When preparing a 40% dispersion, for example, the time required for the flow through the mixer should not be substantially above 1 to 3 seconds. The premixed reactants are then introduced into a final stirrer vessel in which they stay for 20 to 30 minutes before being forced into another vessel or removal of the water by distillation. It is advisable to use less water when carrying out the continuous flow mixing process than that used for the discontinuous reaction under reflux.

Distillation of water may also be carried out at a later stage, but the dispersions then obtained have a higher viscosity.

In practice, for obtaining very low viscosities, preference will be given to the discontinuous process in reaction vessels followed by immediate removal of water by distillation because of its great simplicity, reliability in reaction control and reproducibility.

The quantity of water required for subsequent reactions such as preparation of polyurethane foams may, of course, be left in the finished dispersion.

The concentration of polyaddition products in the dispersing agent containing hydroxyl groups may vary within a wide range but is generally between about 1 and about 75% by weight, particularly between 5 and 65% by weight. The dispersions prepared according to the invention have viscosities of up to 80,000 cP, preferably up to 40,000 cP, at 25° C., depending on their concentration. After dilution to a solids content of 10% by weight, they generally have a viscosity below 2500, preferably below 1500 cP at 25° C. It is surprisingly found that if dispersions are prepared at very high concentrations and diluted to the desired final concentration, the products obtained have a lower viscosity than those directly prepared with the desired solids content.

As already explained above, dispersions having a surprisingly high solids content, up to 60% or more, can be prepared economically in stirrer vessels with reflux condenser in spite of the strongly exothermic reaction of isocyanate groups with amino groups. Since dispersions having a solids content of about 10% by weight are generally used for producing polyurethane resins, it is possible to mix the concentrated dispersions with high proportions by weight of those hydroxyl containing alcohols, e.g. polyesters, which might partially react with water or amino compounds, e.g. hydrolysis or aminolysis, at the temperatures at which preparation of the dispersion is carried out. Thus, for example, a 10% (20%) dispersion in which the proportion by weight of polyether to polyester is 1:8 (1:3) and which has a viscosity only slightly higher than that of the pure polyester can be obtained from a 50% polyhydrazodicarbonamide dispersion in polyether by stirring four times (1.5 times) its quantity of polyester into it (see Examples).

Compared with the possible analogous method of preparation of non-ionic dispersions, the process according to the invention, preferably carried out using chain lengthening agents containing salt groups, is surprisingly found to be generally simpler in practice to carry out because the water content in the reaction mixture is not very important. Satisfactory products are obtained both with relatively large and with relatively small quantities of water whereas, when preparing dispersions of non-ionogenic products, it is generally necessary to keep the quantity of water within a more restricted range. The ions present evidently increase the compatibility between polyol and water by virtue of their hydrophilic character, but they also increase the compatibility between these components and the dispersed ionic solid matter.

The use of higher molecular weight hydroxyl polyethers as dispersing agents in the process according to the invention opens up the possibility, as already mentioned above, of a highly economic and variable method of commercial production carried out under mild conditions to produce dispersions having a high solids concentration which may, if desired, be used as master batches. The use of polyethers has, however, yet another important advantage: The large scale commercial production of polyethers in most cases leads to the formation of intermediate stages of aqueous crude polyethers having a water content of from 8 to 12% and containing from 0.3 to 1% by weight of alkali metal sulphates in solution and, in addition, from 1 to 3% by weight of toluene in suspension. Such a crude polyether suspension is normally distilled under reduced pressure to reduce the water and toluene to a residue of from 0.4 to 1% by weight. The alkali metal sulphates are thereby precipitated and can be removed by means of sponge filters.

The polyether, now free from sulphates and containing from 0.5 to 1% by weight of water, is substantially freed from its residual water content by thin layer evaporation so that the purified commercial polyether contains less than 0.5% by weight of water. For the process according to the invention, however, it is not necessary to use a highly purified, practically anhydrous polyether. The preliminary crude polyether stages are satisfactory for the process, either the substance obtained before thin layer evaporation or, what is particularly advantageous, the so-called crude polyether suspension (containing about 10% of water, alkali metal sulphate and toluene). In the process according to the invention, the water, toluene and sulphate are removed by distillation and filtration after termination of the isocyanate polyaddition reaction.

According to another possible variation of the present invention, polyisocyanate polyaddition products dispersed in the polyhydroxyl compounds are subsequently cross-linked with formaldehyde in known manner in the presence of catalytic quantities of acids or bases. It is surprisingly found that cross-linked dispersions of this kind are also finely disperse and stable in storage.

The dispersions prepared by the process according to the invention can be used as "modified" lower or higher molecular weight polyhydroxyl compounds in known manner in reactions with polyisocyanates of the kind mentioned above, to which unmodified polyhydroxyl compounds or polyamines, hydrazines or hydrazides of the kind mentioned above may be added as chain lengthening agents. Blowing agents, catalysts and other additives may also be added to produce polyurethane resins with improved mechanical properties. Examples of the products which may be produced include foams, elastomers, homogeneous and porous coatings, lacquers and thermoplastic polyurethanes. In addition, the products of the process may be used as they are or after conversion to "modified" prepolymers by reaction with a polyisocyanate excess for producing aqueous polyurethane dispersions by known methods.

One factor which is of major importance in determining the improvement in properties in the resulting polyurethane resins, particularly the improvement in compression resistance and tensile strength, is the particle size of the dispersed polyaddition products. Thus, for example, when using polyether dispersions as starting materials for the production of polyurethane foams, the diameter of the particles of filler must be substantially below the dimensions of the cell walls (20 to 50 $\mu$m). In polyurethane coatings, the particles must be small enough to ensure that even very thin coatings can be applied evenly and have a smooth surface.

The process according to the invention advantageously gives rise to dispersions having particles sizes of from 0.01 to 5 $\mu$m, preferably 0.1 to 1 $\mu$m, which satisfy commercial requirements.

One particularly preferred purpose for which the ionic dispersions according to the invention are used is the production of foams which contain ionic groups, (i.e. foams which have been rendered hydrophilic). One of the characteristics of such hydrophilic foams, for example, is that they are wetted more easily and are capable, depending on their hydrophilic character, of absorbing larger quantities of water than conventional products. The foams may also be used, for example, as ionic exchangers.

To produce such foams, the hydroxyl groups of the dispersing agent, which may also contain reactive groups still present in the dispersed polyurethane particles, are reacted with the isocyanates described above in the presence of blowing agents, for example in the presence of the water still left in the dispersions from the process used for preparing them.

According to one special variation of this process, aqueous polymer latices may be added to the reaction mixture before foaming for example by analogy to the process described in German Offenlegungsschrift No. 2,014,385 and U.S. Pat. No. 2,993,013. This modification can be used for further modifying the properties of the hydrophilic foams.

The foams with ionic groups have a substantially higher conductivity than conventional non-ionic products. They are very suitable for the known methods of high frequency welding techniques. The products also have a distinctly increased capacity for dye absorption.

If desired, other compounds which are reactive with isocyanates as well as catalysts, organic blowing agents, fillers and additives, may also be used.

Suitable organic blowing agents include e.g. acetone; ethyl acetate; halogenated alkanes such as methylene chloride, chloroform, ethylidene chloride, vinylidene chloride, monofluorotrichloromethane, chlorodifluoromethane and dichlorodifluoromethane; butane, hexane, heptane and diethylether. The action of a blowing agent can also be obtained by the addition of compounds which decompose at temperatures above room temperature to liberate gases such as nitrogen, e.g. azo compounds such as azoisobutyric acid nitrile. Other examples of blowing agents and details concerning the use of blowing agents may be found in Kunstoff Handbuch, Volume VII, published by Vieweg and Hochtlen, Carl-Hanser-Verlag, Munich 1966, e.g. on pages 108 and 109, 453–455 and 507–510.

Catalyst may in many cases be used. These include known catalysts such as tertiary amines, e.g., triethylamine; tributylamine; N-methylmorpholine; N-ethylmorpholine; N-cocomorpholine; N,N,N',N'-tetramethylethylene diamine; 1,4-diazabicyclo-(2,2,2)-octane; N-methyl-N'-dimethyl-aminoethylpiperazine; N,N-dimethylbenzylamine; bis-(N,N-diethylaminoethyl) adipate; N,N-diethylbenzylamine; pentamethyldiethylenetriamine; N,N-dimethylcyclohexylamine; N,N,N',N'-tetramethyl-1,3-butanediamine; N,N-dimethyl-β-phenylethylamine; 1,2-dimethylimidazole; and 2-methylimidazole. The known Mannich bases obtained from secondary amines such as dimethylamine and aldehydes, preferably formaldehyde, or ketones such as acetone, methyl ethyl ketone, cyclohexanone and phenols such as phenol itself, nonylphenol or bisphenol may also be used as catalyst.

Suitable catalyst in the form of tertiary amines having hydrogen atoms which are reactive with isocyanate groups include e.g. triethanolamine, triisopropanolamine, N-methyldiethanolamine, N-ethyl-diethanolamine, N,N-dimethylethanolamine and their reaction products with alkylene oxides such as propylene oxide and/or ethylene oxide.

Silaamines having carbon-silicon bonds may also be used as catalysts, for example those described in German Pat. No. 1,229,290 and U.S. Pat. No. 3,620,984, e.g. 2,2,4-trimethyl-2-silamorpholine and 1,3-diethylaminomethyl-tetramethyl-disiloxane.

Basic nitrogen compounds such as tetraalkylammonium hydroxides, alkali metal hydroxides such as sodium hydroxide, alkali metal phenolates such as sodium phenolate and alkali metal alcoholates such as sodium methylate may also be used as catalysts. Hexahydrotriazines are also suitable catalysts.

Organic metal compounds may also be used as catalysts in particular organic tin compounds.

The organic tin compounds used are preferably tin (II) salts of carboxylic acids such as tin(II) acetate, tin(II) octoate, tin(II) ethyl hexoate and tin(II) laurate, and tin(IV) compounds such as dibutyl tin oxide, dibutyl tin dichloride, dibutyl tin diacetate, dibutyl tin dilaurate, dibutyl tin maleate or dioctyl tin diacetate. Any of the above mentioned catalysts may, of course be used as mixtures.

Other representatives of catalysts which may be used and details concerning the action of the catalyst may be found in Kunststoff-Handbuch, Volume VII, published by Vieweg and Hochtlen, Carl-Hanser-Verlag, Munich 1966, e.g. on pages 96 to 102.

The catalysts are generally used in a quantity of between about 0.001 and 10% by weight.

Surface-active additives such as emulsifiers and foam stabilizers may also be used when producing polyurethane foams. Suitable emulsifiers include e.g. the sodium salts of ricinoleic sulphonates or salts of fatty acids with amines such as oleic acid diethylamine or stearic acid diethanolamine. Alkali metal or ammonium salts of sulphonic acids such as dodecylbenzenesulphonic acid or dinaphthylmethane disulphonic acid or of fatty acids such as ricinoleic acid or of polymeric fatty acids may also be used as surface active additives.

Suitable foam stabilizers are, particularly, the polyether siloxanes, especially those which are water soluble. These compounds generally have a polydimethylsiloxane group attached to a copolymer of ethylene oxide and propylene oxide. Foam stabilizers of this kind have been described for example, in U.S. Pat. Nos. 2,834,748; 2,917,480 and 3,629,308.

Other additives which may be used in the production of polyurethane resins include reaction retarders, e.g. substances which are acid in reaction such as hydrochloric acid or organic acid halides; cell regulators known per se such as paraffins, fatty alcohols or dimethylpolysiloxanes; pigments; dyes; flame retarding agents known per se such as trischloroethylphosphate, tricresyl phosphate, ammonium phosphate and polyphosphate; stabilizers against ageing and weathering; plasticizers; fungistatic and bacteriostatic substances; and fillers such as barium sulphate, kieselguhr, carbon black or whiting.

Other examples of surface active additives, foam stabilizers, cell regulators, reaction retarders, stabilizers, flame retarding substances, plasticizers, dyes, fillers and fungistatic and bacteriostatic substances which may also be used when producing polyurethane resins and details concerning their use and mode of action may be found in Kunststoff-Handbuch, Volume VII, published by Vieweg and Hochtlen, Carl-Hanser-Verlag, Munich 1966, e.g. on pages 103 to 113.

The components used for production of the foams are reacted by the known one-shot prepolymer or semi-prepolymer process, in many cases using mechanical devices such as those described in U.S. Pat. No. 2,764,565. Details concerning processing apparatus which may be used may be found in Kunststoff-Handbuch, Volume VII, published by Vieweg and Hochtlen, Carl-Hanser-Verlag, Munich 1966, e.g. on pages 121 to 305.

The foaming reaction for producing the foams is often carried out inside molds. The reaction mixture is introduced into a mold made of a metal such as aluminum or a synthetic product such as epoxide resin and is foamed up inside the mold to produce the shaped product. Foaming inside molds may be carried out either to produce articles having a cellular structure on their surface or to produce articles having a compact skin and cellular center. One or other effect can be achieved by either introducing just sufficient reaction mixture into the mold to fill the mold after foaming or introducing a larger quantity of reaction mixture. The latter method is known as "overcharging", a procedure which has been described, for example, in U.S. Pat. Nos. 3,178,490 and 3,182,104.

The process of foaming in molds is frequently carried out using known "external mold release agents" such as silicone oils but so-called "internal mold release agents" may also be used, optionally in admixture with external mold release agents, e.g. as disclosed in German Offenlegungsschriften Nos. 2,121,670 and 2,307,589.

Cold setting foams can also be produced as described in British Pat. No. 1,162,517 and German Offenlegungsschrift No. 2,153,086.

Foams may, of course, also be produced by the process of block foaming or by the known laminator process.

The following Examples serve to explain the process according to the invention. The figures given represent parts by weight of percentages by weight unless otherwise indicated.

EXAMPLE 1

20% Anionic polyurea dispersion in trifunctional polyether

Index (NCO/NH·100)=100

Anion equivalent quantity=0.275/100 g of solid matter

Reaction mixture:

80.0 parts by weight of a polyether of propylene oxide and ethylene oxide started on trimethylol propane and having a hydroxyl number of 34 and containing about 80% of primary hydroxyl groups (hereinafter referred to as "polyether I") as dispersing agent;

9.6 parts by weight of tolylene diisocyanate (isomeric mixture 2,4:2,6=80:20) hereinafter referred to as "T 80";

10.4 parts by weight of aliphatic diamine sulphonate $H_2N-CH_2-CH_2-NH-CH_2-CH_2-SO_3^\ominus Na^\oplus$, hereinafter referred to as AAS salt (used as 45% aqueous solution); and a total of 11% by weight of water, based on the quantity of reaction mixture including water (=15.3%, based on dispersing agent; 61.3% based on solid matter; 12.3% based on anhydrous dispersion).

PREPARATION OF THE DISPERSION

A mixture of dispersing agent and aqueous diamine sulphonate solution is heated to 45° C. in a stirrer vessel equipped with reflux condenser. The isocyanate is then rapidly stirred in so that the heat released by the exothermic reaction raises the temperature to 80° to 100° C. Stirring is continued for 20 to 30 minutes after all the isocyanate has been added. Water is finally distilled off at reduced pressure. The resulting very finely divided, stable 20% dispersion containing a residue of 0.6% of water has a viscosity of 2400 cP/25° C.

EXAMPLE 2

12% Anionic polyurea dispersion in trifunctional polyether

Index=128

Anion equivalent quantity=0.242/100 g of solid matter.

Reaction mixture:
88.0 parts by weight of polyether I;
6.5 parts by weight of diisocyanate T 80;
5.5 parts by weight of AAS salt;
6.1% by weight of water, based on reaction mixture including water (7.4% based on dispersing agent; 54.2% based on solid matter; 6.5% based on anhydrous dispersion).

The method is similar to that described in Example 1. The resulting, finely divided dispersion which has a solids content of 12% and contains a residue of 0.2% of water has a viscosity of 2400 cP/25° C.

EXAMPLE 3

22.3% Anionic polyurea dispersion in trifunctional polyether

Index=100

Anion equivalent quantity=0.27/100 g of solid matter.

Reaction mixture:
77.7 parts by weight of polyether I;
7.7 parts by weight of diisocyanate T 80;
3.3 parts by weight of phenyl isocyanate;
11.3 parts by weight of AAS salt;
11.6% by weight of water, based on reaction mixture including water (=17% based on dispersing agent, 59.3% based on solid matter, 13.2% based on anhydrous end product).

The procedure is similar to that of Example 1. A 22.3% dispersion containing a residue of 0.4% of water and having a viscosity of 2850 cP/25° C. is obtained.

EXAMPLE 4

14.2% Polyurea-polyhydrazodicarbonamide dispersion in trifunctional polyether

Index=100

Anion equivalent quantity=0.043/100 g solid matter
Reaction mixture;
85.8 parts by weight of polyether I;
11.2 parts by weight of diisocyanate T 80;
1.1 part by weight of AAS salt,
1.9 parts by weight of hydrazine (in the form of 99% hydrazine hydrate; added together with the AAS salt solution), and a total of 2.3% by weight of water, based on the reaction mixture including water (=2.8% based on dispersing agent, 16.8% based on solid matter, 2.4% based on anhydrous dispersion).

PREPARATION OF THE DISPERSION

The 45% aqueous AAS salt solution and hydrazine hydrate are mixed with the dispersing agent in a stirrer vessel and the reaction is then started by the addition of diisocyanate at room temperature. The reaction temperature rises to 60°–80° C. After 60 minutes, water is distilled off at reduced pressure.

The resulting stable 14.2% dispersion which still contains a residue of 0.3% of water has a viscosity of 6300 cP/25° C. After dilution to 10% with a further quantity of polyether I, it has a viscosity of 3400 cP/25° C.

COMPARISON EXPERIMENT

When no aqueous AAS salt solution is used, i.e. when hydrazine hydrate is used alone under otherwise the same reaction conditions and at the same index, a non-ionic 14% paste having a viscosity of 125,000 cP/25° C. is obtained

EXAMPLE 5

39.1% Polyurea polyhydrazo-dicarbonamide dispersion in trifunctional polyether

Index=100

Anion equivalent content—0.03/100 g of solid matter
Reaction Mixture:
60.9 parts by weight of polyether I,
31.5 parts by weight of diisocyanate T 80.
2.1 parts by weight of AAS salt,
5.5 parts by weight of hydrazine (as 99% hydrate),
23.8% by weight of water based on reaction mixture including water (51.5% based on dispersing agent, 80% based on solid matter, 31.3% based on anhydrous dispersion).

PREPARATION OF THE DISPERSION

The reaction vessel used is a stirrer vessel with highly efficient reflux condenser and an inlet tube with non-return valve in the lower third of the reaction vessel. The dispersing agent, heated to 80° C., is mixed with the diluted aqueous solution of hydrazine hydrate and AAS salt. The diisocyanate is then forced in so rapidly at the same temperature, with stirring that polyaddition proceeds under vigorous reflux. Distillation of water is started after 10 minutes at reduced pressure. The temperature rises to 110° C. towards the end of the reaction, and the practically anhydrous dispersion obtained is run through a 100 μm sieve. The very finely divided and stable 39.1% dispersion obtained in this way has a viscosity of 11,500 cP/25° C. When diluted to 20% by weight or 10% by weight with polyether I, the dispersion has a viscosity of 2100 cP or 1310 cP/25° C. If, on the other hand, the water is distilled off only after 2 days, difficulties arise when attempts are made to heat the highly viscous paste, which contains 23.8% of water, when it has cooled to room temperature. Furthermore, the viscosity of the anhydrous dispersion is between 2.5 and 4 times higher, depending on its solid content, than that found after direct distillation.

EXAMPLE 6

The 39.1% dispersion described in Example 5 is vigorously mixed at 30° to 60° C. with a polyester (hydroxyl number 56, acid number 1, viscosity 21,400 cP/25° C.) prepared from trimethylolpropane, diethylene glycol and adipic acid. It is surprisingly found that the following stable dispersions are obtained:

(a) a dispersion having a solids content of 20% (ratio by weight of polyester to polyether=5:3), has a viscosity of 17,800 cP/25° C.;

(b) a dispersion having a solids content of 10% (ratio by weight of polyester to polyether=5:1) has a viscosity of 9600 cP/25° C.

If, for comparison, the unmodified polyester and polyether are mixed in the given ratios by weight, phase separation occurs within a short time.

EXAMPLE 7

Tetrahydroxyalkyl-functional polyurea dispersion in trifunctional polyether

Index 1: (NCO/NH·100)=100
Index 2: (NCO/(NH+OH)·100)=91
Anion equivalent content=0.028/100 g solid matter.
Reaction mixture:
60.0 parts by weight of polyether I but in the form of the crude ether suspension containing 12% by weight of water and 0.7% by weight of alkali metal sulphate;
31.0 parts by weight of diisocyanate T 80.
2.2 parts by weight of AAS salt,
1.8 parts by weight of diethanolamine,
5.0 parts by weight of hydrazine hydrate (in the form of the 99% hydrate diluted with water) and a total of
20% by weight of water, based on the reaction mixture including water (41.6% based on dispersing agent, 62.5% based on solid matter, 25% based on anhydrous dispersion).

The procedure employed for preparing the dispersion is similar to that of Example 5. The resulting, very finely divided, dispersion has a viscosity of 5290 (or 1750 or 1050) cP/25° C. at a concentration of 40% (or 20% or 10%).

EXAMPLE 7a

When the 40% dispersion in polyether obtained according to Example 7 is diluted with the same polyester as in Example 6, stable polyurea dispersions are obtained (polyether:polyester=3:5 or 1:5) which at concentrations of 20% and 10% have a viscosity of 17,200 cP/25° C. or 21,000 cP/25° C.

EXAMPLE 7b

When Example 7 is repeated but the quantity of polyether in the reaction mixture is reduced so that the concentration of solid matter is 50% and, if a total of 20% by weight of water is used, based on the quantity of reaction mixture (50% based on dispersing agent or solid matter, 25% based on anhydrous dispersion), a very finely divided, stable dispersion having a viscosity of 6150 cP/25° C. is obtained. When this is diluted with pure dispersing agent to a solid content of 40%, 20% or 10%, the resulting dispersions have viscosities of 3400, 1480 and 1030 cP/25° C.

EXAMPLE 7c

If Example 7 is repeated but the quantity of polyether is modified so that the solid content of the resulting dispersion is 60% and if a total of 20% by weight of water is added, based on the quantity of reaction mixture (62.5% based on dispersing agent, 41.6% based on solid matter, 25% based on anhydrous dispersion), a finely divided, stable dispersion having a viscosity of 28,700 cP/25° C. is obtained. When the dispersion is diluted to a solid content of 40%, 20% or 10%, the resulting viscosities are 3800, 1550 and 1080 cP/25° C.

EXAMPLE 8

17.8% polyurea-polyhydrazo-dicarbonamide dispersion in trifunctional polyether

Index=100
Carboxylate-ion equivalent quantity=0.04/100 g of solid matter.
Reaction mixture:
82.2 parts by weight of a polyethylene oxide, started on trimethylolpropane (OH number 550, hereinafter referred to as polyether II);
15.2 parts by weight of tolylene diisocyanate (mixture of isomers 2,4:2,6=65:35);
1.4 parts by weight of hydrazine (in the form of 99% hydrate diluted with water);
1.2 parts by weight of the diaminocarboxylate of the formula $$H_2N-CH_2-CH_2-NH-CH_2-CH_2-COO^{\ominus}Li^{\oplus}$$

and a total of
10% by weight of water, based on the quantity of reaction mixture including water (13.8% based on dispersing agent, 59.5% based on solid matter, 11.2% based on anhydrous dispersion).

A finely divided 17.8% dispersion having a viscosity of 3200 cP/25° C. is obtained under the reaction conditions indicated in Example 5. When the dispersion is diluted to 10% using pure dispersing agent, the resulting viscosity is 2100 cP/25° C.

EXAMPLE 9

14.2% Polyurea-polyhydrazodicarbonamide dispersion in linear polyether

Index=100
Sulphonate-ion equivalent content=0.04/100 g of solid matter.
Reaction Mixture:
85.8 parts by weight of linear polypropylene glycol having secondary hydroxyl groups (hydroxyl number 56, hereinafter referred to as polyether III);
10.5 parts by weight of diisocyanate T 80,
1.8 parts by weight of hydrazine (used as 99% hydrate),
1.9 parts by weight of diaminosulphonate of the formula

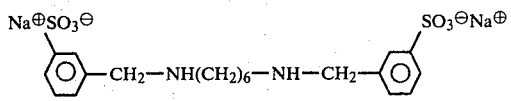

10% by weight of water, based on the quantity of reaction mixture including water (13.8% based on dispersing agent, 59.5% based on solid matter, 11.2% based on anhydrous dispersion).

When the general method of procedure described in Example 1 is employed, a stable 14.2% dispersion having a viscosity of 3,800 cP/25° C. is obtained. When this is diluted to 10% with pure dispersing agent, the diluted dispersion has a viscosity of 2250 cP/25° C.

COMPARISON EXAMPLE

When only 1% by weight of water instead of 10% is used in the reaction mixture under otherwise identical conditions, a paste having a viscosity of 280,000 cP/25° C. is obtained.

EXAMPLE 9a

If a 14% polyether dispersion is prepared in a manner analogous to Example 9 using a mixture of 5.22 parts by weight of diisocyanate T 80 and 7.5 parts by weight of 4,4'-diphenylmethane diisocyanate, a stable dispersion is obtained having a viscosity of 4500 cP/25° C. when anhydrous at a solid content of 14% and a viscosity of 2550 cP/25° C. at a solid content of 10%.

EXAMPLE 10

20% Cationic polyurethane dispersion in linear polyether

Index = 100
Cation equivalent quantity = 0.34/100 g of solid matter.
Reaction Mixture:
80.0 parts by weight of polyether III;
11.8 parts by weight of diisocyanate T 80;
8.2 parts by weight of N-methyldiethanolamine,
7% by weight of water, based on the total quantity of reaction mixture.

METHOD OF PREPARATION

Polyether, water and N-methyl diethanolamine are mixed in a vessel equipped with stirrer. The diisocyanate is then added slowly with cooling so that the reaction temperature does not rise above 50° C. The water is distilled off at reduced pressure 60 minutes after all the diisocyanate has been added. Towards the end of distillation, the temperature is gradually raised to 90° C. A dispersion having a viscosity of 2110 cP/25° C. is obtained. This dispersion is quaternized in a second stage:

An equivalent quantity (based on tertiary nitrogen) of dimethylsulphate diluted with 4 times its quantity by weight of pure dispersing agent is gradually introduced into the dispersion with vigorous stirring. The reaction mixture is kept at 60° to 70° C. for 30 minutes with stirring to complete the reaction. The finely divided cationic dispersion obtained has a viscosity of 1380 cP/25° C. at a solids content of 20%.

EXAMPLE 11

9.5% Cationic polyurea-polyhydrazodicarbonamide dispersion in trifunctional polyether Index = 100
Cation equivalent content = 0.04/100 g of solid matter.
Reaction Mixture:
90.5 parts by weight of polyether I,
7.3 parts by weight of diisocyanate T 80,
1.2 parts by weight of hydrazine (added in the form of 99% hydrazine hydrate),
0.6 parts by weight of triamine of the formula

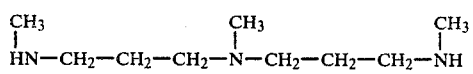

0.4 parts by weight of dimethylsulphate,
10% by weight of water, based on the quantity of reaction mixture (practically completely removed by distillation before quanternization is carried out).

The method employed in the first stage (preparation of dispersion) is analogous to that of Example 1 and in the second stage (quaternization) analogous to that of Example 10. A stable cationic 9.5% dispersion having a viscosity of 2350 cP/25° C. is obtained.

EXAMPLE 12

4% polyurea dispersion in copolyester

Index = 50
Ion equivalent content = 0.364/100 g of solid matter.
Reaction Mixture:
96 parts by weight of copolyester of 1,6-hexanediol, neopentyl glycol and adipic acid (OH number 63, acid number 1.5),
1.2 parts by weight of 1,6-hexamethylenediisocyanate,
2.8 parts by weight of AAS salt,
3.1% by weight of water, based on the quantity of reaction mixture (3.4% based on dispersing agent, 81.3% based on solid matter, 3.2% based on end product).

The method is similar to that of Example 1. An anhydrous polyester dispersion is obtained which has a softening point 25° C. lower than that of the pure polyester.

EXAMPLE 13

33.7% polyurea dispersion in tetraethylene glycol

Reaction Mixture:
66.3 parts by weight of tetraethyleneglycol,
16.6 parts by weight of diisocyanate T 80,
17.1 parts by weight of AAS (as aqeuous solution) and a total of
20% by weight of water, based on the total quantity of reaction mixture (38% based on dispersing agent 74.6% based on solid matter, 25% based on anhydrous dispersion).

The method is similar to that of Example 1. A stable, finely divided dispersion having a viscosity of 2950 cP/25° C. is obtained.

The following Examples illustrate the use of the ionic dispersions according to the invention for producing soft foams and cold setting, highly elastic polyurethane foams or elastomers and aqueous polyurethane dispersions.

EXAMPLE 14

100 parts by weight of anionic polyhydrazodicarbonamidepolyether dispersion from Example 5 adjusted to a solid content of 10%
2.7 parts by weight of water,
0.03 parts by weight of triethylamine,
0.2 parts by weight of 2-dimethylamino-ethanol
0.8 parts by weight of commercial polysiloxane stabilizer (OS 20 of Bayer AG) and 0.35 parts by weight of tin-(II) octoate are mixed together. The mixture is vigorously stirred together with 33.4 parts by weight of tolylene diisocyanate (65% 2,4- and 35% 2,6- isomer) at room temperature.

A creamy reaction mixture forms within 7 seconds. It has a rise time of 70 seconds and a gel time of 115 seconds.

The resulting foam is found to have the following mechanical properties:

| | |
|---|---|
| Gross density | according to DIN 53420 |
| | 41 kg/m$^3$ |
| Tensile strength | according to DIN 53571 |
| | 160 kPa |
| Elongation at break | according to DIN 53571 |
| | 195% |
| Compression resistance | according to DIN 53577 |
| | 6.3KPa |
| Indentation hardness | according to ASTM D 1564-71T: |
| H-value at 25% deformation | 302 |
| H-value at 65% deformation | 597 |
| RH-value at 25% deformation | 194 |
| (25% RH-value/25% | 66% |
| H-value × 100 | |
| 65% H-value/25% H-value | 2.0 |

The specific electric resistance of this foam according to DIN 52,482 is $6.2 \times 10^{12}$ Ohm.cm whereas a comparable foam produced without a polyether having ionic groups has a corresponding resistance of $2.1 \times 10^{13}$ Ohm.cm.

EXAMPLE 15

100 parts by weight of the dispersion from Example 14,
5.5 parts by weight of water,
0.03 parts by weight of triethylenediamine,
0.3 parts by weight of 2-dimethylaminoethanol,
1.5 parts by weight of polysiloxane stabilizer (OS 20 of Bayer AG) and
0.35 parts by weight of tin-(II) octoate are mixed together. 59.8 parts by weight of tolylene diisocyanate (65% 2,4-isomer and 35% 2,6-isomer) are added to this mixture with vigorous stirring at room temperature. A creamy reaction mixture is formed after 6 seconds. It has a rise time of 78 seconds and a gel time of 124 seconds.

The foam obtained is found to have the following mechanical properties:

| | |
|---|---|
| Gross density | according to DIN 53420 |
| | 22 kg/m$^3$ |
| Tensile Strength | according to DIN 53571 |
| | 135 KPa |
| Elongation at break | according to DIN 53571 |
| | 170% |
| Compression resistance | according to DIN 53577 |
| | 3.8 KPa |
| Indentation hardness | according to ASTM D 1564-71T |
| H-value at 25% deformation | 128 |
| H-value at 65% deformation | 260 |
| RH-value at 25% deformation | 82 |
| (25% RH-value/25% | 64% |
| H-value) × 100 | |
| 65% H-value/25% H-value | 2.0 |

The following Examples demonstrate the manufacture of a cold setting, highly elastic polyurethane foam.

EXAMPLE 16

100 parts by weight of the dispersion used in Example 14,
3.0 parts by weight of water,
0.1 part by weight of triethylene diamine,
0.3 parts by weight of 2-dimethylamino-ethanol,
1.0 part by weight of a commercial polysiloxane polyether foam stabilizer manufactured by Goldschmidt (B 3207)
2.0 parts by weight of diethanolamine and
2.0 parts by weight of trichloroethyl phosphate are mixed together. 38.1 parts by weight of tolylene diisocyanate (80% 2,4-isomer and 20% 2,6-isomer) are added to this mixture at room temperature and mixed. A creamy reaction mixture is formed after 7 seconds. It has a rise time of 135 seconds and a gel time of 148 seconds.

The resulting foam is found to have the following mechanical properties:

| | |
|---|---|
| Gross density | according to DIN 53420 |
| | 36 kg/m$^3$ |
| Tensile strength | according to DIN 53571 |
| | 95 KPa |
| Elongation at break | according to DIN 53571 |
| | 150% |
| Compression resistance | according to DIN 53577 |
| | 2.4 KPa |
| Indentation hardness | according to ASTM D1564-71T: |
| H-value at 25% deformation | 93 |
| H-value at 65% deformation | 218 |
| RH-value at 25% deformation | 76 |
| (25% RH-value/ | 82% |
| H-value) × 100 | |
| 65% H-value/25% H-value | 2.4 |

EXAMPLE 17

100 parts by weight of the dispersion according to Example 14,
3.0 parts by weight of water,
0.06 parts by weight of triethylene diamine,
0.2 parts by weight of 2-dimethylaminoethanol,
1.0 part by weight of a commercial siloxane foam stabilizer manufactured by Goldschmidt (B 3207),
2.0 parts by weight of diethanolamine and
2.0 parts by weight of trichloroethylphosphate are mixed together. 38.1 parts by weight of tolylene diisocyanate (80% 2,4-isomer and 20% 2,6-isomer) are added to the mixture at room temperature and the components are vigorously mixed while air is added at an excess pressure of 0.5 atmospheres. A creamy reaction mixture forms after 8 seconds. It has a rise time of 145 seconds and a gel time of 163 seconds.

The foam obtained is found to have the following mechanical properties:

| | |
|---|---|
| Gross density | according to DIN 53420 |
| | 41 kg/m$^3$ |
| Tensile strength | according to DIN 53571 |
| | 130 KPa |
| Elongation at break | according to DIN 53571 |
| | 95% |
| Compression resistance | according to DIN 53577 |
| | 3.6 KPa |
| Indentation hardness | according to ASTM D 1564-71T: |
| H-value at 25% deformation | 82 |
| H-value at 65% deformation | 208 |
| RH-value at 25% deformation | 68 |
| (25% RH-value/25% | 85% |

-continued

| | |
|---|---|
| H-value) × 100 | |
| 65% H-value/25% H-value | 2.5 |

EXAMPLE 18

100 parts by weight of the cationic dispersion of Example 11 adjusted to a solid content of 9.5%

2.7 parts by weight of water, 0.1 part by weight of triethylenediamine, 0.3 part by weight of 2-dimethylaminoethanol, 0.8 parts by weight of polysiloxane stabilizer (OS 15 of Bayer AG and 0.2 parts by weight of tin-(II) octoate are stirred together. 33.4 parts by weight of tolylene diisocyanate (80% 2,4-isomer and 20% 2,6-isomer) are added to this mixture at room temperature and the mixture is vigorously stirred. A creamy reaction mixture which has a rise time of 240 seconds is formed after 15 seconds.

The resulting foam is found to have the following mechanical properties:

| | |
|---|---|
| Gross density | according to DIN 53420 10 kg/m³ |
| Tensile strength | according to DIN 53571 150 KPa |
| Elongation at break | according to DIN 53571 160% |
| Compression resistance | according to DIN 53577 6.1 KPa |
| Pressure deformation residue: | |
| (22h at 70° C. 90%) | according to DIN 53572 9.9 |

EXAMPLE 19

100 parts by weight of the cationic dispersion used in Example 18, 3.0 parts by weight of water, 0.1 part by weight of triethylenediamine, 0.3 parts by weight of 2-dimethylaminoethanol, 1.0 parts by weight of a commercial polyether polysiloxane foam stabilizer of Goldschmidt (B 3207), 2.0 parts by weight of diethanolamine and 2.0 parts by weight of trichloroethylphosphate are mixed together. 37.4 parts by weight of tolylene diisocyanate (80% 2,4-isomer and 20% 2,6-isomer) are vigorously stirred into the mixture at room temperature. A creamy reaction mixture which has a rise time of 118 seconds is obtained after 10 seconds.

The resulting foam is found to have the following mechanical properties:

| | |
|---|---|
| Gross density | according to DIN 53420 31 kg/m³ |
| Tensile strength | according to DIN 53571 90 KPa |
| Elongation at break | according to DIN 53571 100% |
| Compression resistance | according to DIN 53577 3.7 KPa |
| Pressure deformation residue | |
| (22h at 70° C. 90%) | according to DIN 53572 6.4 |

EXAMPLE 20

Preparation of a 40% aqueous polyurethane dispersion

The anionic 4% polyurea dispersion in a polyester obtained according to Example 12 is converted into a polyisocyanate prepolymer by reaction with excess 1,6-hexamethylene diisocyanate (index=190) at 80° to 120° C. The prepolymer is cooled to 50°-60° C. and an aqueous 1,2-propylene diamine solution (index=120) containing 10% by weight acetone (based on the prepolymer) is rapidly added. The small proportion of solvent present is subsequently distilled off. The resulting stable aqueous 40% dispersion has a viscosity of 850 cP at 25° C. and can be used, for example, for coating textiles.

COMPARISON EXPERIMENT

When preparation of the isocyanate prepolymer is carried out directly in the presence of the AAS salt, normally present in the form of a 45% aqueous solution, gelling occurs within 10 to 20 minutes. When employing the conventional procedure, it is therefore necessary first to prepare a non-ionic prepolymer and then to dissolve this in about twice its quantity of acetone, based on the prepolymer (i.e. about 20 times the quantity of solvent used in Example 20) before the water and diamine may be added. Finally, all the acetone must be distilled off.

EXAMPLE 21

100 parts by weight of the polyurea dispersion (dispersed in polyester:polyether=5:1) according to Example 7a, adjusted to a solid content of 10%, 4.0 parts by weight of water, 0.6 parts by weight of dimethylbenzylamine;

0.1 part by weight of tin-(II) octoate, 2.0 parts by weight of a commercial polysiloxane foam stabilizer (OS 25 of Bayer AG) are mixed together. The mixture is vigorously stirred together with 22.2 parts by weight of diisocyanate T 80 at room temperature. A creamy reaction mixture forms after 10 seconds. It has a rise time of 65 seconds and a gel time of 125 seconds. In contrast to the usual pure polyester foams, the foam obtained has open cells and, owing to its uniform, very fine cell structure it may be used e.g. as filter material. If the example is repeated using a mixture of unmodified pure polyester and polyether in the same proportions, an open cell foam is again obtained but it has substantially larger cells.

The mixture of pure polyester and polyether separates within a short time into two phases when left to stand at room temperature.

EXAMPLE 22

Preparation of a homogeneous polyether-polyurethane elastomer

The 50% polyether dispersion obtained according to Example 7B is reacted with excess 4,4'-diphenylmethane diisocyanate at 100° to 120° C. to produce an isocyanate prepolymer containing 2.3% by weight of free isocyanate groups. 1,4-butanediol (index=104) is stirred into the prepolymer at the same temperature. The highly viscous melt is poured out onto a surface (metal or glass) within 10 to 15 minutes and drawn out to a film of 250 μm using a doctor knife. The film is then heated at 130° C., cooled and stripped from its substrate. The tensile strength of the film is 212 Kp/cm², its elongation at break 180% and its Shore A hardness 77. The elastomer is insoluble even in hot dimethyl formamide.

COMPARISON EXPERIMENT

When the pure polyether is used instead of the dispersion but the reaction mixture is otherwise kept the same, sticky polyether-polyurethane film is obtained which has so little tensile strength that it cannot be stripped from its substrate.

EXAMPLE 23

A mixture of 25 parts by weight of the 40% anionic dispersion according to Example 7, 75 parts by weight of a copolyether of 10% ethylene oxide and 90% propylene oxide started on trimethylolpropane (hydroxyl number 42), 8.4 parts by weight of a 64.6% aqueous polyvinyl chloride dispersion, 0.8 parts by weight of 2-dimethylaminoethanol, 0.3 parts by weight of polysiloxane foam stabilizer (OS 20 of Bayer AG) and 0.1 part by weight of tin-(II) octoate is vigorously stirred together with 38.2 parts by weight of diisocyanate T 80.

A creamy reaction mixture forms after 14 seconds. It has a rise time of 131 seconds.

The foam obtained is found to have the following mechanical properties:

| Gross density | according to DIN 53420 24 kg/m³ |
| --- | --- |
| Tensile strength | according to DIN 53571 145 KPa |
| Elongation at break | according to DIN 53571 120% |
| Compression resistance | according to DIN 53547 4.2 KPa |

EXAMPLE 24

A mixture of 100 parts by weight of the same polyether mixture as in Example 23, 7.5 parts by weight of a 33% aqueous ABS polymer dispersion 0.1 part by weight of triethylene diamine, 0.3 part by weight of 2-dimethylaminoethanol, 0.6 parts by weight of polysiloxane foam stabilizer (OS 20 of Bayer AG) and 0.2 parts by weight of tin-(II) octoate is vigorously stirred together with 59.2 parts by weight of diisocyanate T 80.

A creamy reaction mixture forms after 15 seconds. It has a rise time of 85 seconds.

The resulting foam is found to have the following mechanical properties:

| Gross density | according to DIN 53420 21 kg.m³ |
| --- | --- |
| Tensile strength | according to DIN 53571 90 KPa |
| Elongation at break | according to DIN 53571 100% |
| Compression resistance | according to DIN 53577 4.1 KPa |

EXAMPLE 25

A mixture of 100 parts by weight of the polyether mixture used in Example 23, 5.0 parts by weight of a 40% aqueous copolymer dispersion of styrene and acrylonitrile, 0.8 parts by weight of 2-dimethylaminoethanol, 0.3 parts by weight of a polysiloxane foam stabilizer (OS 20 of Bayer AG) and 0.1 parts by weight of tin-(II) octoate is vigorously stirred together with 38.2 parts by weight of diisocyanate T 80.

A creamy reaction mixture which has a rise time of 145 seconds is formed after 14 seconds.

The resulting foam is found to have the following mechanical properties:

| Gross density | according to DIN 53420 34 kg/m³ |
| --- | --- |
| Tensile strength | according to DIN 53571 140 KPa |
| Elongation at break | according to DIN 53571 165% |
| Compression resistance | according to DIN 53577 4.6 KPa |

EXAMPLE 26

Continuous method of carrying out the process of Example 1 in a multiphase reaction flow tube.

The reactants are stored in two storage vessels B1 and B2. Vessel B1 contains a mixture of 8000 parts by weight of polyether I, 104 parts by weight of AAS salt and 127 parts by weight of water. Vessel B2 contains 96 parts by weight of diisocyanate T 80. The rate of feed is 103.1 q per minute from B1 and 9.6 g per minute from B2, making a total of 112.7 g per minute.

METHOD

The mixture which has been heated to 95° C. in B1 and the diisocyanate which is kept at 20° C. in B2 are combined coaxially in a static mixer manufactured by Kenics (diameter ¼ inch; 21 elements; volume approximately 3 ml) (residence time longer than 1.1 seconds) with the aid of a twin piston pump, and the mixture is delivered at a pressure of 2 to 3 bar into a steel reaction tube having a length of about 6 m and a diameter of about 9 mm in which the temperature of the reaction mixture is kept at 110°±5° C. by external heating or cooling. The reaction tube opens into a decompression vessel in which the practically anhydrous dispersion is stirred at 80° C. and a pressure of 20 Torr during an average residence time of about 6 to 10 minutes. The decompression vessel is connected to a distillation bridge and via a pump to a further vessel which receives the end product. The resulting finely divided dispersion has a viscosity of 2050 cP at 25° C.

EXAMPLE 27

Example 7 is repeated, but using the internal salt of diaminodisulphonic acid of the following formula

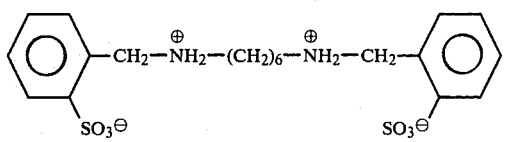

("dibetaine") instead of the AAS salt indicated in the formulation. This dibetaine, however, must be dissolved in diethanolamine and hydrazine monohydrate (30% at 100° C. in water). A very finely divided dispersion which has free sulphonic acid groups is obtained.

At a concentration of 40%, it has a viscosity of 4450 cP at 25° C.

EXAMPLE 28

20% Anionic polyurea dispersion in Polyether I

Anion equivalent quantity=0.13/100 g of solids content.

FORMULATION 1562 parts by weight of Polyether I;
207.6 parts by weight of 46% aqueous AAS salt solution;
136 parts by weight of 25% aqueous ammonia solution
261 parts by weight of 2,4-tolylene diisocyanate (hereinafter referred to as T 100).

WATER CONTENT

11% by weight based on anhydrous dispersion.

REACTION CONDITIONS

The dispersing agent and aqueous solutions of the amino functional compounds are introduced into the reaction vessel as described in Example 1 and the diisocyanate is introduced into the liquid phase of the reaction mixture at such a rate that the temperature is raised from 40° C. to 80° C. by the exothermic reaction.

The anhydrous 20% (10%) dispersion has a viscosity of 4900 (735) cP at 25° C.

EXAMPLE 29

20% Anionic polyurea dispersion in polyether III

Anion equivalent quantity: 0.17/100 g of solid content.

FORMULATION 1164 parts by weight of polyether III;
204 parts by weight of 46.5% aqueous AAS salt solution;
34 parts by weight of 25% aqueous ammonia solution;
187.5 parts by weight of 4,4'-diphenylmethane diisocyanate (hereinafter referred to as diisocyanate D44)

The total water content is 8.6% by weight, based on the anhydrous dispersion.

The method is the same as in Example 28 but in this case diisocyanate D 44 heated to 80° C. is introduced into the reaction mixture kept at 25° to 30° C., and the temperature is adjusted by cooling so that it does not exceed 65° C.

The 20% (10%) anhydrous dispersion has a viscosity of 1820 (1150) cP at 25° C.

EXAMPLE 30

An aqueous formalin solution (5% by weight formaldehyde based on the solid content of the dispersion) and a catalytic quantity of toluene sulphonic acid are added to the dispersion obtained in Example 29, optionally before the water is removed from the dispersion by distillation, and the temperature of the mixture is gradually raised from 40° to 95° C. over a period of 60 to 90 minutes with stirring. The water is then distilled off at reduced pressure.

The resulting anionic polyurea dispersion which contains polymethylene urea groups has a viscosity of 1890 cP at a concentration of 20%.

A polyurethane foam produced from this dispersion has a higher compression resistance than a foam produced from the unmodified dispersion of Example 29.

EXAMPLE 31

20% Anionic polyurea dispersion in polyether III

Anion equivalent quantity: 0.18/100 g of solid content.

FORMULATION 1164 parts by weight of polyether III;
204 parts by weight of 46.5% aqueous AAS salt solution;
34 parts by weight of 25% aqueous ammonia solution;
43.5 parts by weight of diisocyanate T 100;
125 parts by weight of diisocyanate D 44

The total water content is 8.4% by weight, based on the anhydrous dispersion.

The method is analogous to that of Example 28 but diisocyanate T 100 is first added at 20° to 30° C., and thereafter diisocyanate D 44 (heated to 80° C.) is added at 30° to 55° C.

The resulting finely divided, anhydrous, 20% dispersion has a viscosity of 1190 cP at 25° C.

What is claimed is:

1. A process for the in situ preparation of a stable dispersion of polyisocyanate-polyaddition products in hydroxyl containing compounds as dispersing agent which comprises reacting:
   (1) organic polyisocyanate with
   (2) at least one compound containing a group selected from the group consisting of primary amino groups, secondary amino groups, and primary hydroxyl groups in
   (3) as dispersing agent, an alcohol selected from the group consisting of alcohols containing 2 to 8 primary hydroxyl groups, alcohols containing 2 to 8 secondary hydroxyl groups, and mixtures thereof, with the proviso that compounds (3) have secondary hydroxyl groups if compounds with primary hydroxyl groups are used as compounds (2), and further characterized in that at least one of component (1) or (2) has groups selected from the group consisting of ionic groups and groups capable of salt formation.

2. The process of claim 1, wherein the reaction is carried out discontinuously in stirrer vessels in the presence of from about 5 to about 50% by weight of water, based on the total quantity of reaction mixture.

3. The process of claim 2 further comprising the step of removing the water.

4. The process of claim 1, wherein the polyaddition reaction is carried out continuously in continuous flow mixers.

5. The process of claim 4 wherein the process is carried out in the presence of more than 1% by weight of water, based on the total quantity of reaction mixture.

6. The process of claim 5 wherein the water is subsequently removed in known manner.

7. The process of claim 1, wherein the dispersing agents used are unpurified crude polyethers containing water, solvents and alkali metal salts, such as are obtained from the commercial production of polyethers.

8. The process of claim 1, wherein the compounds used as component (2) are selected from the groups consisting of polyamines, hydrazines, and hydrazides.

9. The stable dispersion product of the process of claim 1.

10. The process of claim 1, wherein said dispersing agent has a molecular weight of at least 62.

* * * * *